United States Patent
Takashima et al.

(10) Patent No.: US 9,115,769 B2
(45) Date of Patent: Aug. 25, 2015

(54) TORQUE CONVERTER

(75) Inventors: Masato Takashima, Sagamihara (JP); Kouji Ozaki, Izunokuni (JP)

(73) Assignees: NISSAN MOTOR CO., LTD., Yokohama-shi (JP); JATCO LTD, Fuji-shi (JP)

(*) Notice: Subject to any disclaimer, the term of this patent is extended or adjusted under 35 U.S.C. 154(b) by 354 days.

(21) Appl. No.: 13/822,091

(22) PCT Filed: Sep. 6, 2011

(86) PCT No.: PCT/JP2011/070280
§ 371 (c)(1),
(2), (4) Date: Mar. 11, 2013

(87) PCT Pub. No.: WO2012/036030
PCT Pub. Date: Mar. 22, 2012

(65) Prior Publication Data
US 2013/0174538 A1    Jul. 11, 2013

(30) Foreign Application Priority Data
Sep. 13, 2010  (JP) .................................. 2010-204542

(51) Int. Cl.
*F16H 41/24*   (2006.01)
*F16D 31/00*   (2006.01)
*F16H 45/02*   (2006.01)

(52) U.S. Cl.
CPC ................ *F16D 31/00* (2013.01); *F16H 45/02* (2013.01); *F16H 41/24* (2013.01); *F16H 2045/0226* (2013.01); *F16H 2045/0294* (2013.01)

(58) Field of Classification Search
CPC ......................... F16H 41/14; F16H 2045/0284
USPC ...................................................... 60/345, 346
See application file for complete search history.

(56) References Cited

U.S. PATENT DOCUMENTS

| | | | | |
|---|---|---|---|---|
| 2,588,668 A * | 3/1952 | Syrovy | ........................... | 60/338 |
| 2,687,616 A * | 8/1954 | Kelley | ........................... | 60/345 |
| 2,762,197 A * | 9/1956 | Ullery | ........................... | 60/345 |
| 2,854,300 A * | 9/1958 | Winchell | ........................ | 384/618 |
| 3,205,662 A * | 9/1965 | Gabriel | ........................... | 60/343 |
| 3,238,727 A * | 3/1966 | Gabriel | ........................... | 60/343 |
| 3,382,855 A * | 5/1968 | Wilhelm | .................... | 123/559.1 |
| 3,665,707 A * | 5/1972 | Koivunen | ....................... | 60/345 |
| 5,511,640 A * | 4/1996 | Fukunaga | .................... | 192/3.28 |
| 2007/0220877 A1 * | 9/2007 | George et al. | ................... | 60/345 |
| 2008/0185257 A1 | 8/2008 | Ochi et al. | | |

FOREIGN PATENT DOCUMENTS

| | | |
|---|---|---|
| JP | 4-28258 U | 3/1992 |
| JP | 2003-287104 A | 10/2003 |
| RU | 2052163 C1 | 1/1996 |
| RU | 2066408 C1 | 9/1996 |
| SU | 336457 A1 | 4/1972 |

* cited by examiner

*Primary Examiner* — Thomas E Lazo
(74) *Attorney, Agent, or Firm* — Foley & Lardner LLP

(57) ABSTRACT

A torque converter of the present invention includes a pump impeller, a turbine impeller, a first stator impeller, a second stator impeller, a first one-way clutch annularly provided on the inner periphery of the first stator impeller, and a second one-way clutch annularly provided from the inner periphery of the first one-way clutch to the inner periphery of the second stator impeller. The first stator impeller is coupled to a fixed shaft via the first and second one-way clutches, and the second stator impeller is coupled to the fixed shaft only via the second one-way clutch.

4 Claims, 1 Drawing Sheet

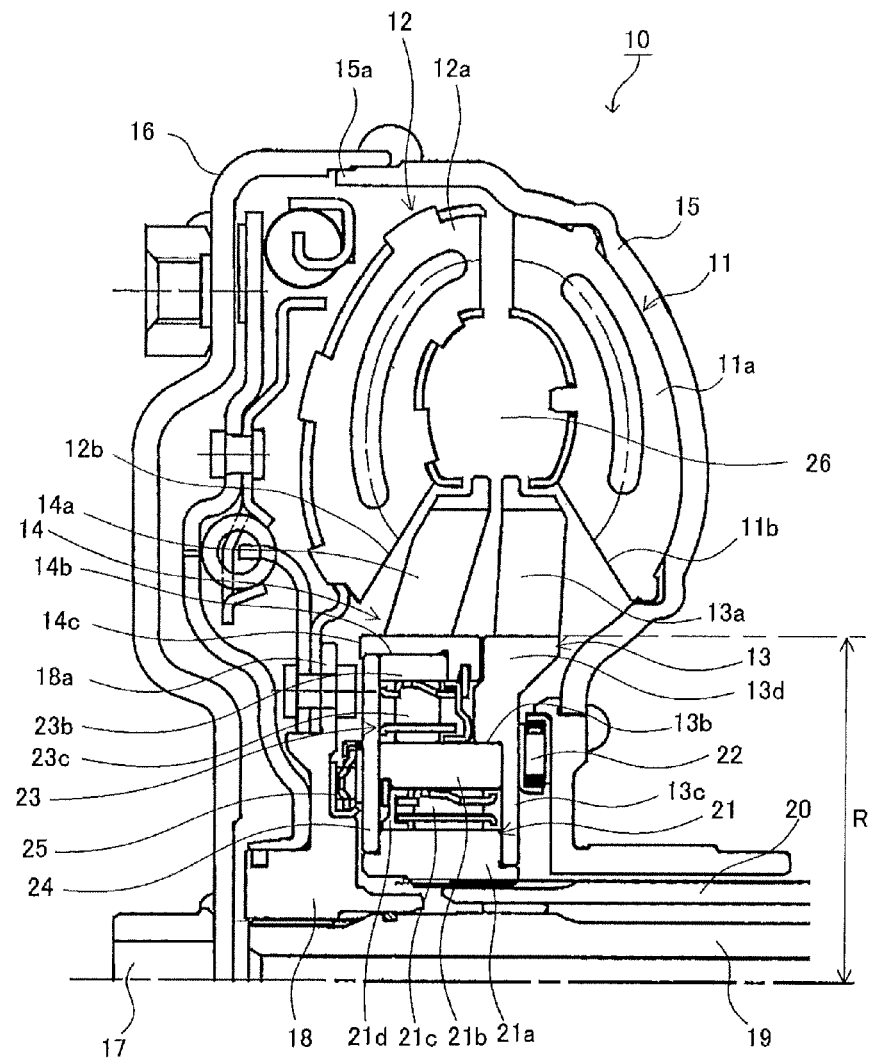

TORQUE CONVERTER

TECHNICAL FIELD

The present invention relates to an arrangement structure of a stator and a one-way clutch in a torque converter.

BACKGROUND ART

A torque converter includes a drive-side pump impeller, a driven-side turbine impeller, a stator impeller fixed to a case of the torque converter and a one-way clutch for restricting a rotational direction of the stator impeller to one direction.

Further, a configuration is known in which two stator impellers are provided to improve transmission efficiency, these two stator impellers are arranged side by side in an axial direction to form a predetermined clearance therebetween, and each of the two stator impellers includes an independent one-way clutch.

However, since the two one-way clutches are arranged side by side in the axial direction at a radially inner side of the stator impellers in such a torque converter, an axial dimension of the entire torque converter increases.

Accordingly, a configuration is disclosed in JP4-28258U in which, out of two one-way clutches, one one-way clutch is provided at a radially inner side of stator impellers and the other one-way clutch is provided in an inner core portion located at a radially outer side of the stator impellers and surrounded by a pump impeller, a turbine impeller and the stator impellers.

SUMMARY OF INVENTION

However, since the one one-way clutch is provided in the inner core portion in the above conventional technology, the inner core portion becomes larger, a fluid part of the torque converter becomes larger and an axial dimension of the torque converter increases.

The present invention aims to reduce an axial dimension of a torque converter while avoiding the enlargement of an inner core portion.

A torque converter according to one aspect of the present invention includes a pump impeller, a turbine impeller, a first stator impeller, a second stator impeller, a first one-way clutch annularly provided on the inner periphery of the first stator impeller, and a second one-way clutch annularly provided from the inner periphery of the first one-way clutch to the inner periphery of the second stator impeller. The first stator impeller is coupled to a fixed shaft via the first and second one-way clutches, and the second stator impeller is coupled to the fixed shaft only via the second one-way clutch.

An embodiment and advantages of the present invention are described in detail below with reference to the accompanying drawing.

BRIEF DESCRIPTION OF DRAWING

FIG. 1 is a schematic configuration diagram showing the configuration of a torque converter in an embodiment.

DESCRIPTION OF EMBODIMENTS

FIG. 1 is a schematic configuration diagram showing the configuration of a torque converter in an embodiment. The torque converter 10 is a four-element, single-stage and three-phase fluid type torque converter and includes a pump impeller 11, a turbine runner 12, a first stator 14 and a second stator 13 constituting four elements and a case 15 and a front cover 16 for housing these four elements and defining a filling space for a working fluid inside.

The case 15 is a case main body of the torque converter 10 and integrally rotates with an input shaft 17 coupled to a rotary shaft of an engine 1. The pump impeller 11 is arranged on the inner wall of the case 15.

The front cover 16 is coupled to the input shaft 17 and fitted into an opening end 15a of the case 15 so as to be integrally rotatable with the case 15.

The pump impeller 11 is formed to define a flow passage for the working fluid by a multitude of blades 11a arranged at predetermined intervals in a circumferential direction on the inner wall of the case 15, and causes the working fluid to flow from a radially inner side (lower side of FIG. 1) to a radially outer side (upper side of FIG. 1) along the flow passage by integrally rotating with the case 15.

The turbine runner 12 extends along the inner wall surface of the front cover 16 and is at a predetermined distance from the front cover 16 to be opposed to the pump impeller 11 between the pump impeller 11 and the front cover 16. The turbine runner 12 is formed to define a flow passage for the working fluid by a multitude of blades 12a arranged at predetermined intervals in the circumferential direction, and is spline-coupled to an output shaft 19, which is an input shaft of a transmission 3, via a turbine hub 18. The turbine runner 12 is rotatable concentrically with the pump impeller 11 and rotated by the flow of the working fluid from the pump impeller 11 along the flow passage from a radially outer side (upper side of FIG. 1) to a radially inner side (lower side of FIG. 1) to transmit a drive force to the output shaft 19.

The turbine hub 18 is so coupled to the output shaft 19 as to include a disk-shaped increased diameter portion 18a on a disk and the turbine runner 12 is coupled to the disk-shaped increased diameter portion 18a.

The first and second stators 14, 13 are provided between the pump impeller 11 and the turbine runner 12 to be adjacent to a radially inner side 11b of the pump impeller 11 and a radially inner side 12b of the turbine runner 12 and each of them forms a flow passage for the working fluid by a multitudes of blades 13a, 14a arranged at predetermined intervals in the circumferential direction.

The first stator 14 is provided on the turbine runner 12 side between the pump impeller 11 and the turbine runner 12 and rectifies the working fluid flowing back from the radially inner side 12b of the turbine runner 12 to the radially inner side 11b of the pump impeller 11 similarly to the second stator 13. The first stator 14 is coupled to a stator shaft 20, which is a fixed shaft, via a first one-way clutch 23 and a second one-way clutch 21.

The second stator 13 is provided on the pump impeller 11 side between the pump impeller 11 and the turbine runner 12 and rectifies the working fluid flowing back from the radially inner side 12b of the turbine runner 12 to the radially inner side 11b of the pump impeller 11. The second stator 13 is coupled to the stator shaft 20 via the second one-way clutch 21.

The second one-way clutch 21 is composed of a cylindrical inner race 21a, a second outer race 21b formed to have a cylindrical shape having a larger diameter than the inner race 21a, and a multitude of second rollers 21c arranged at predetermined intervals in the circumferential direction between the inner race 21a and the second outer race 21b.

The inner race 21a is provided on the outer periphery of the stator shaft 20. The second outer race 21b is provided radially outwardly of the inner race 21a and on an inner periphery 13b of the second stator 13. The second rollers 21c restrict a rotational direction of the second outer race 21b to a predetermined one direction (same direction as the rotational direction of the pump impeller).

A thrust bearing 22 is provided on a side surface 13c radially inwardly of the blades 13a of the second stator 13. The thrust bearing 22 supports the second stator 13 in an axial direction while allowing the relative rotation of the second stator 13 and the case 15.

The first one-way clutch 23 is composed of the second outer race 21b described above, a first outer race 23b formed to have a cylindrical shape having a larger diameter than the second outer race 21b and a multitude of first rollers 23c arranged at predetermined intervals in the circumferential direction between the second outer race 21b and the first outer race 23b.

The first outer race 23b is provided radially outwardly of the second outer race 21b and on an inner periphery 14b of the first stator 14. The first rollers 23c restricts the relative rotation of the first outer race 23b and the second outer race 21b only to a predetermined one direction which is the same as with the second one-way clutch 21. Specifically, the first and second one-way clutches 23, 21 share the second outer race 21b.

A disk-shaped plate 24 opposed to the turbine hub 18 is crimped and fixed to a side surface 14c of the first stator 14 on the turbine runner 12 side. The plate 24 radially extends from the inner periphery 14b of the first stator 14 to the inner race 21a of the second one-way clutch 21, and a thrust bearing 25 is provided on a side surface of the plate 24 on the turbine runner 12 side. The thrust bearing 25 supports the first stator 14 in the axial direction while allowing the relative rotation of the turbine runner 12 and the first stator 14.

An end bearing 21d is provided on the front cover 16 side of the second one-way clutch 21. Further, the inner race 21a and the second outer race 21b are press-fitted into a supporting member 13d on the case 15 side of the second one-way clutch 21, thereby specifying a radial dimension of the second one-way clutch 21. Since the supporting member 13d functions to specify the radial dimension by a end bearing, the end bearing needs not be arranged on the case 15 side and an axial dimension of the second one-way clutch 21 can be shortened.

As is also clear from FIG. 1, the first and second one-way clutches 23, 21 are composed of the inner race 21a, the first outer race 23b, the second outer race 21b, the first rollers 23c and the second rollers 21c. The first and second one-way clutches 23, 21 are arranged in the order of the second one-way clutch 21 and the first one-way clutch 23 toward the radially outer side from the stator shaft 20. Since the second stator 13 is coupled to the outer periphery of the second one-way clutch 21 and the first one-way clutch 23 is arranged on this outer periphery, the second one-way clutch 21 has an axial dimension larger than that of the first one-way clutch 23.

Further, the first and second one-way clutches 23, 21 are arranged in a part surrounded by the blades 11a, 12a, 13a and 14a of the pump impeller 11, the turbine runner 12, the first stator 14 and the second stator 13 and at a side radially inwardly of the inner core portion 26 in which no blades are present on the sectional view of FIG. 1.

The torque converter 10 in this embodiment is configured as described above, and the first and second one-way clutches 23, 21 are coaxially arranged and both arranged radially inwardly of the inner core portion 26.

Generally, an oil pump for circulating the working fluid of the torque converter is often arranged adjacent to the torque converter in the axial direction. Thus, a reduction in the axial dimension of the radially inner side of the inner core portion is effective to reduce an axial direction of the entire transmission including the torque converter, the oil pump and a transmission mechanism.

However, in the conventional structure in which two one-way clutches are arranged side by side in the axial direction at the radially inner side of the inner core portion, the axial dimension of the radially inner side of the inner core portion increases and the axial dimension of the entire transmission cannot be reduced.

Further, there is known a structure designed to suppress an increase in the axial dimension of the radially inner side of the inner core portion by arranging one of the two one-way clutches in the inner core portion and the other at the radially inner side of the inner core portion. However, in such a structure, since the one one-way clutch is arranged in the inner core portion, an axial dimension of the inner core portion increases. Thus, if the size of the flow passage for the working fluid located around the inner core portion is set according to a maximum transmission torque in design required for the torque converter, the axial dimension of the entire torque converter becomes larger and vehicle mountability is deteriorated. Further, if the axial dimensions of the pump impeller and the turbine runner are reduced in consideration of vehicle mountability, the flow passage for the working fluid cannot be sufficiently secured and a torque cannot be sufficiently transmitted.

Since the two one-way clutches 21, 23 are arranged side by side in a radial direction at the radially inner side of the inner core portion 26 as described above in the torque converter 10 of this embodiment, the axial dimension of the radially inner side of the inner core portion 26 can be reduced and the axial dimension of the entire transmission including the torque converter 10 can be reduced.

Further, since the torque converter 10 of this embodiment includes no member arranged in the inner core portion 26, the axial dimension of the inner core portion 26 can be reduced and the axial dimension of the entire transmission can be reduced while the flow passage for the working fluid corresponding to the maximum transmission torque in design is sufficiently secured.

Further, in the torque converter 10 of this embodiment, inner diameters R of the first and second stators 14, 13 (inner diameters of blade parts of stators) are increased and the axial and radial dimensions of the pump impeller 11 and the turbine runner 12 are reduced (so-called round high torque converter). In this way, the torque converter 10 of this embodiment can suppress an increase in the radial dimension of the entire torque converter 10 even if the two one-way clutches 21, 23 are arranged side by side in the radial direction at the radially inner side of the inner core portion 26.

As described above, in this embodiment, the first and second one-way clutches 23, 21 for restricting the rotational directions of the first and second stators 14, 13 are arranged on the inner peripheries of the first and second stators 14, 13, and the first one-way clutch 23 is provided on the outer periphery of the second one-way clutch 21. In this way, the two one-way clutches 21, 23 are arranged at the radially inner side of the inner core portion 26 and the axial dimension of the torque converter 10 can be reduced without being accompanied by the enlargement of the inner core portion 26 and the enlargement of a working fluid part including the inner core portion 26.

Further, the first and second one-way clutches 23, 21 share the second outer race 21b, and the second outer race 21b functions as an outer peripheral race of the second one-way clutch 21 and as an inner peripheral race of the first one-way clutch 23. This can reduce the radial dimension of the two one-way clutches 21, 23 as a whole and can reduce the number of components to reduce cost.

Further, the plate 24 holding the thrust bearing 25 for supporting the turbine runner 12 and the first stator 14 in the axial direction is crimped and fixed to the side surface 14c of the first stator 14. This can reduce the axial dimension of the first stator 14 by the thickness of a snap ring as compared with a structure for positioning a plate on a stator by the snap ring that has been conventionally used. Further, since no new component for fixing the plate 24 to the first stator 14 is necessary, the number of components can be reduced and cost can be reduced.

Furthermore, since the axial dimension of the second one-way clutch 21 is set to be larger than that of the first one-way clutch 23, a space in the axial direction to arrange the first and second one-way clutches 23, 21 side by side can be secured on the outer periphery of the second one-way clutch 21.

Although the embodiment of the present invention has been described above, the above embodiment merely indicates some of application examples of the present invention and is not of the nature to limit the technical scope of the present invention to the specific configuration of the above embodiment.

For example, although the torque converter 10 including two stators has been described as an example in the above embodiment, there is no limitation to this and the present invention is also applicable to a torque converter including three or more stators. Further, although the roller type one-way clutches have been used in the above embodiment, there is no limitation to this and application to sprag type one-way clutches is also possible.

The present application claims a priority based on Japanese Patent Application No. 2010-204542 filed with the Japan Patent Office on Sep. 13, 2010, all the contents of which are hereby incorporated by reference.

The invention claimed is:

1. A torque converter, comprising:
a pump impeller coupled to an input shaft and defining a flow passage for a working fluid flowing from a radially inner side toward a radially outer side by a plurality of blades arranged at predetermined intervals in a circumferential direction about the input shaft;
a turbine impeller coupled to an output shaft and defining a flow passage for the working fluid flowing from a radially outer side toward a radially inner side by a plurality of blades arranged at predetermined intervals in the circumferential direction about the output shaft to be opposed to the pump impeller;
a first stator impeller provided between the pump impeller and the turbine impeller, defining a flow passage for the working fluid flowing back from the radially inner side of the turbine impeller to the radially inner side of the pump impeller by a plurality of blades arranged at predetermined intervals in the circumferential direction about a fixed shaft concentric with the input shaft and the output shaft, and provided on the turbine impeller side;
a second stator impeller provided between the pump impeller and the turbine impeller, defining a flow passage for the working fluid flowing back from the radially inner side of the turbine impeller to the radially inner side of the pump impeller by a plurality of blades arranged at predetermined intervals in the circumferential direction about the fixed shaft concentric with the input shaft and the output shaft, and provided on the pump impeller side;
a first one-way clutch annularly provided on the inner periphery of the first stator impeller and configured to restrict a rotational direction of the first stator impeller only to a predetermined one direction; and
a second one-way clutch annularly provided from the inner periphery of the first one-way clutch to the inner periphery of the second stator impeller and configured to restrict a rotational direction of the second stator impeller only to a predetermined one direction;
the first stator impeller being coupled to the fixed shaft via the first and second one-way clutches and the second stator impeller being coupled to the fixed shaft only via the second one-way clutch.

2. The torque converter according to claim 1, wherein:
the second one-way clutch includes a cylindrical inner race provided on the outer periphery of the fixed shaft, a cylindrical second outer race coupled to a inner periphery of the second stator impeller and a plurality of second rollers arranged at predetermined intervals in the circumferential direction between the inner race and the second outer race and configured to rotate only when the second outer race rotates in the predetermined one direction; and
the first one-way clutch includes the second outer race, a first outer race coupled to a inner periphery of the first stator impeller and having a larger diameter than the second outer race, and a plurality of first rollers arranged at predetermined intervals in the circumferential direction between the first outer race and the second outer race and configured to rotate only when the first outer race rotates in the predetermined one direction relative to the second outer race.

3. The torque converter according to claim 1, further comprising:
a turbine hub coupling the turbine impeller to the outer shaft and including a disk-shaped increased diameter portion adjacent in an axial direction to a side of the first stator impeller radially inwardly of blades;
a disk-shaped plate coupled to a side surface of the side of the first stator impeller inwardly of the blades to be opposed to the increased diameter portion of the turbine hub; and
a thrust bearing provided on a side surface of the plate and supporting the first stator impeller in the axial direction while allowing the relative rotation of the turbine hub and the plate,
wherein the plate is integrally fixed to the first stator impeller by being crimped.

4. The torque converter according to claim 1, wherein:
an axial dimension of the second one-way clutch is larger that of the first one-way clutch.

* * * * *